United States Patent
Arai et al.

(10) Patent No.: US 12,482,578 B2
(45) Date of Patent: Nov. 25, 2025

(54) WIRING MEMBER

(71) Applicant: Sumitomo Wiring Systems, Ltd., Mie (JP)

(72) Inventors: Kenta Arai, Mie (JP); Kazuhiro Nishimura, Mie (JP); Issei Kano, Mie (JP); Haruka Nakano, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 174 days.

(21) Appl. No.: 18/280,495

(22) PCT Filed: Mar. 18, 2022

(86) PCT No.: PCT/JP2022/012629
§ 371 (c)(1),
(2) Date: Sep. 6, 2023

(87) PCT Pub. No.: WO2022/202667
PCT Pub. Date: Sep. 29, 2022

(65) Prior Publication Data
US 2024/0145120 A1 May 2, 2024

(30) Foreign Application Priority Data
Mar. 26, 2021 (JP) .................. 2021-053454

(51) Int. Cl.
*H01B 7/00* (2006.01)
*B60R 16/02* (2006.01)
*H01B 7/08* (2006.01)

(52) U.S. Cl.
CPC ....... *H01B 7/0045* (2013.01); *B60R 16/0215* (2013.01); *H01B 7/0846* (2013.01); *B60R 16/0207* (2013.01)

(58) Field of Classification Search
CPC ...... H01B 7/08; H01B 7/0838; H01B 7/0045; H01B 7/0846; B60R 16/0215; H02G 3/30; H02G 3/266; H02G 3/305
See application file for complete search history.

(56) References Cited

U.S. PATENT DOCUMENTS

| | | | | |
|---|---|---|---|---|
| 3,733,428 A | * | 5/1973 | Fry | ........... H01B 7/0846 |
| | | | | 156/290 |
| 3,816,673 A | * | 6/1974 | Miya | ........... H04B 3/36 |
| | | | | 174/70 S |

(Continued)

FOREIGN PATENT DOCUMENTS

| JP | 2001-216848 | 8/2001 |
|---|---|---|
| JP | 2007-172847 | 7/2007 |

(Continued)

OTHER PUBLICATIONS

International Search Report issued in International Patent Application No. PCT/JP2022/012629, dated May 10, 2022, along with an English translation thereof.

(Continued)

*Primary Examiner* — Paresh Paghadal
(74) *Attorney, Agent, or Firm* — Greenblum & Bernstein, P.L.C.

(57) ABSTRACT

A wiring member includes: a wiring body including a plurality of wire-like transmission members, a first sheet to which the plurality of wire-like transmission members are fixed, and a second sheet to which at least some of the plurality of wire-like transmission members are fixed; and a connector provided to end portions of the plurality of wire-like transmission members. The second sheet is provided between the first sheet and the connector. Two or more wire-like transmission members including all of thinnest (Continued)

wire-like transmission members in the plurality of wire-like transmission members are fixed to the second sheet.

7 Claims, 6 Drawing Sheets

(56) References Cited

U.S. PATENT DOCUMENTS

| | | | | |
|---|---|---|---|---|
| 3,881,976 | A * | 5/1975 | Jones | B44F 11/00 385/115 |
| 4,874,908 | A * | 10/1989 | Johansson | H02B 1/202 439/402 |
| 2005/0068250 | A1 * | 3/2005 | Cornec | H02G 3/32 343/702 |
| 2009/0188716 | A1 * | 7/2009 | Nagase | H01Q 21/06 174/72 A |
| 2017/0327060 | A1 * | 11/2017 | Nakajima | H01B 13/01254 |
| 2018/0350486 | A1 * | 12/2018 | Egami | H01B 13/01209 |
| 2019/0061649 | A1 * | 2/2019 | Hilliker | H02G 3/0481 |
| 2019/0287700 | A1 * | 9/2019 | Hamada | H01B 7/0045 |
| 2019/0392963 | A1 | 12/2019 | Ishida et al. | |
| 2020/0139906 | A1 * | 5/2020 | Mizuno | F16B 19/00 |
| 2022/0017026 | A1 | 1/2022 | Yamaguchi et al. | |

FOREIGN PATENT DOCUMENTS

| | | | |
|---|---|---|---|
| JP | 2016-139551 | 8/2016 | |
| JP | 2018-137208 | 8/2018 | |
| WO | WO-2011010558 A1 * | 1/2011 | H01B 11/203 |
| WO | 2020/110631 | 6/2020 | |

OTHER PUBLICATIONS

International Preliminary Report on Patentability issued in International Patent Application No. PCT/JP2022/012629, dated Sep. 28, 2023, along with an English translation thereof.

Japan Office Action issued in Japan Patent Application No. 2021-053454, dated Sep. 17, 2024, together with English translation thereof.

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Document(s)

Patent Document 1: Japanese Patent Application Laid-Open No. 2018-137208

SUMMARY

Problem to be Solved by the Invention

It is desired that a width dimension of a part of a flat wiring member close to a terminal can be reduced while a part thereof away from the terminal is kept in a flat state. It is also desired that a thin wire-like transmission member can withstand a larger impact load.

Accordingly, an object is to provide a technique in which a thin wire-like transmission member can withstand a larger tensile load and a width dimension of a part close to a terminal can be reduced while keeping a part located away from the terminal in a flat state.

Means to Solve the Problem

A wiring member according to the present disclosure includes: a wiring body including a plurality of wire-like transmission members, a first sheet to which the plurality of wire-like transmission members are fixed, and a second sheet to which at least some of the plurality of wire-like transmission members are fixed; and a connector provided to end portions of the plurality of wire-like transmission members, wherein the second sheet is provided between the first sheet and the connector, and two or more wire-like transmission members including all of thinnest wire-like transmission members in the plurality of wire-like transmission members are fixed to the second sheet.

Effects of the Invention

According to the present disclosure, a thin wire-like transmission member can withstand a larger tensile load and a width dimension of a part close to a terminal can be reduced while keeping a part located away from the terminal in a flat state.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes: a wiring body including a plurality of wire-like transmission members, a first sheet to which the plurality of wire-like transmission members are fixed, and a second sheet to which at least some of the plurality of wire-like transmission members are fixed; and a connector provided to end portions of the plurality of wire-like transmission members, wherein the second sheet is provided between the first sheet and the connector, and two or more wire-like transmission members including all of thinnest wire-like transmission members in the plurality of wire-like transmission members are fixed to the second sheet. The second sheet is provided between the first sheet and the connector, thus a width dimension of a part of the second sheet in the wiring body close to a terminal can be reduced while keeping a part of the first sheet in the wiring body located away from the terminal in a flat state. Two or more wire-like transmission members including all of the thinnest wire-like transmission members in the plurality of wire-like transmission members are fixed to the second sheet, thus the thinnest wire-like transmission member can withstand the larger tensile load.

(2) In the wiring member according to (1), the plurality of wire-like transmission members may include an electrical wire having a conductor cross-sectional area of 0.35 square millimeters or less as each of the thinnest wire-like transmission members. Accordingly, a position where an electrical wire having a conductor cross-sectional area of 0.35 square millimeters or less can be easily used is increased in a vehicle, and cost and weight of a wiring member for the vehicle can be reduced.

(3) In the wiring member according to (1) or (2), an interval between the connector and the second sheet may be equal to or larger than 120 millimeters and equal to or smaller than 260 millimeters. Accordingly, the wire-like transmission member can withstand the larger tensile load while keeping easiness of housing the end portions of the plurality of wire-like transmission members in a connector housing.

(4) In the wiring member according to any one of (1) to (3), an interval between the first sheet and the second sheet may be equal to or larger than two thirds of a width dimension of the first sheet in an end portion of the first sheet. Accordingly, a width dimension of a part of the wiring body close to the terminal can be reduced while keeping a part thereof located away from the terminal in a flat state.

(5) In the wiring member according to any one of (1) to (4), a width dimension of the wiring body in a position of the second sheet may be smaller than a width dimension of the wiring body in a position of the first sheet. Accordingly, even in a case where a region located close to the connector in a region where the wiring member is disposed in the vehicle has a gap narrowed by a surrounding member, interference between the wiring member and the surrounding member is suppressed.

(6) In the wiring member according to any one of (1) to (5), all of the plurality of wire-like transmission members may be fixed to the second sheet. Accordingly, the wire-like transmission member easily withstands the larger tensile load. In the plurality of wire-like transmission members, it is not necessary to distinguish between those which are fixed to the second sheet and those which are not.

(7) In the wiring member according to any one of (1) to (5), it is also applicable that the plurality of wire-like transmission members include a first wire-like transmission member as each of the thinnest wire-like transmission members and at least one second wire-like transmission member thicker than the first wire-like transmission member, and the at least one second wire-like transmission member is not fixed to the second sheet. Accordingly, a region for fixing the second wire-like transmission member can be reduced in the second sheet.

(8) In the wiring member according to any one of (1) to (7), it is also applicable that the plurality of wire-like transmission members include the plurality of thinnest wire-like transmission members, and only the plurality of thinnest wire-like transmission members are fixed to the second sheet. Even when only the thinnest wire-like transmission member is fixed in the second sheet, a load can be dispersed to the other thinnest wire-like transmission member or the second sheet, thus the thinnest wire-like transmission member can withstand the larger tensile load.

DETAILED DESCRIPTION OF EMBODIMENT OF PRESENT DISCLOSURE

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 1:
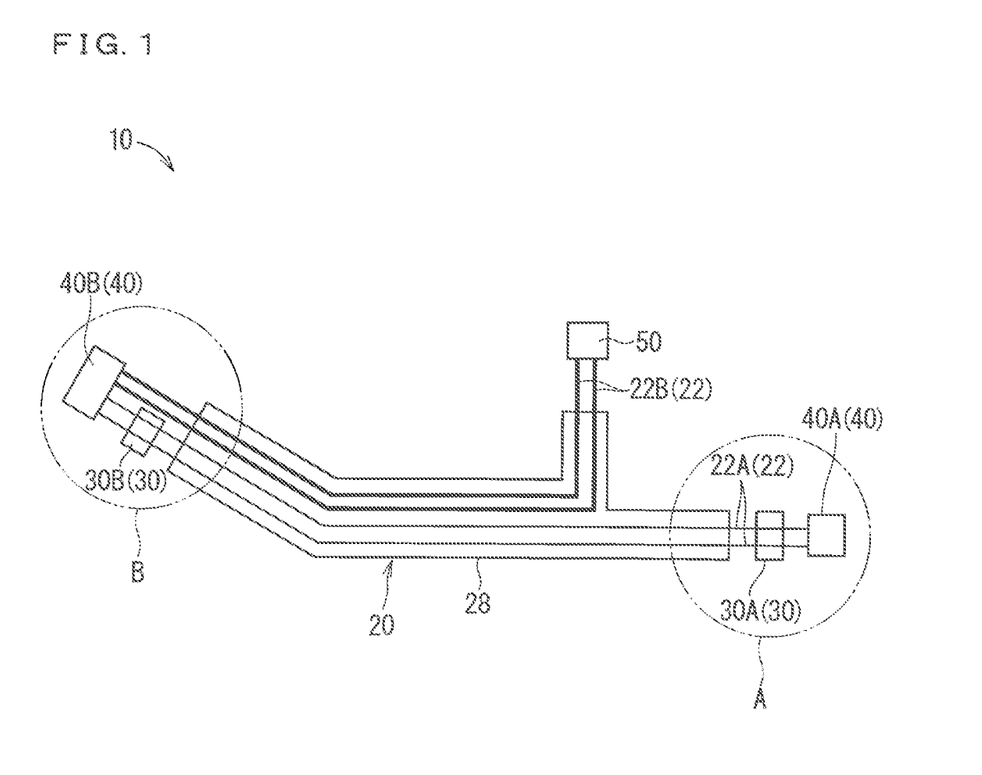
FIG. 1 is a schematic plan view illustrating a wiring member according to an embodiment 1.

A wiring member according to an embodiment 1 is described hereinafter. FIG. 1 is a schematic plan view illustrating a wiring member 10 according to the embodiment 1.

The wiring member 10 includes a wiring body 20 and a connector 40. The wiring body 20 includes a plurality of wire-like transmission members 22, a first sheet 28, and a second sheet 30. The connector 40 is provided to end portions of the plurality of wire-like transmission members 22. The plurality of wire-like transmission members 22 are fixed to the first sheet 28. The second sheet 30 is provided between the first sheet 28 and the connector 40. At least some of the plurality of wire-like transmission members 22 are fixed to the second sheet 30. Two or more wire-like transmission members 22 including all of the thinnest wire-like transmission members 22A in the plurality of wire-like transmission members 22 are fixed to the second sheet 30.

Herein, three connectors 40A, 40B, and 50 are provided. Second sheets 30A and 30B are provided in parts of three connectors 40A, 40B, and 50 corresponding to two connectors 40A and 40B. The second sheet 30 is not provided in a part of three connectors 40A, 40B, and 50 corresponding to one connector 50. When two connectors 40A and 40B need to be distinguished, they are referred to as the connectors 40A and 40B, and when they need not be distinguished, they are referred to as the connector 40 in some cases.

The plurality of wire-like transmission members 22 are wire-like members transmitting electrical power or light, for example. The plurality of wire-like transmission members 22 are assumed to be members connecting components in a vehicle.

Figure 3:
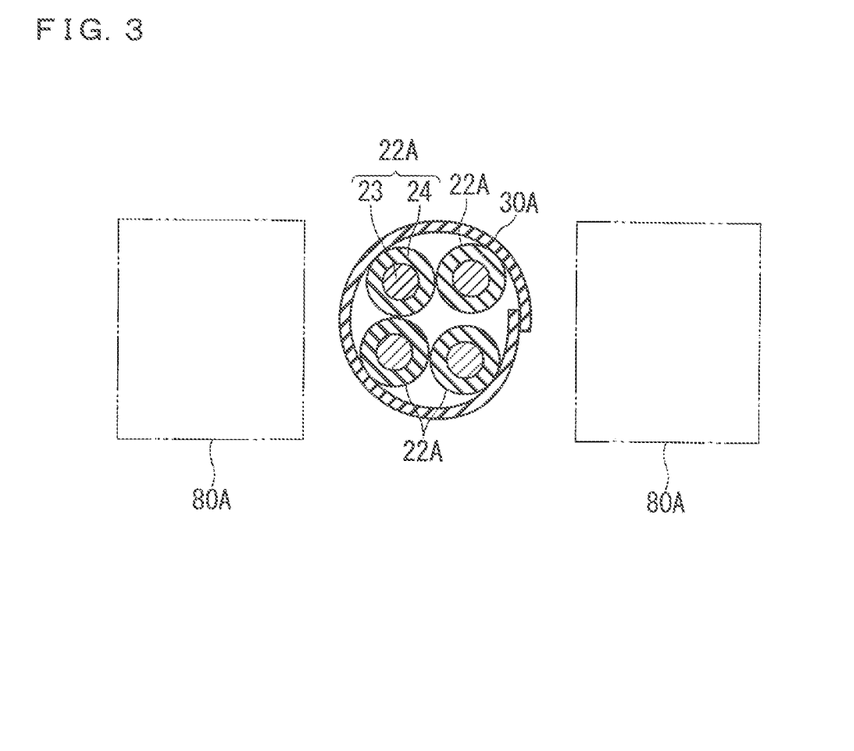
FIG. 3 is a cross-sectional view along a III-III line in FIG. 2.

The wire-like transmission member 22 includes a transmission wire body 23 and a covering layer 24 (refer to FIG. 3). The transmission wire body 23 is a transmission route transmitting electrical power or light. For example, when the wire-like transmission member 22 is an electrical wire, the transmission wire body 23 is a conductor core wire. The conductor core wire is made up of one or a plurality of strands. The strand is formed of copper, copper alloy, aluminum, or aluminum alloy as a material, for example. When the wire-like transmission member 22 is an optical fiber, the transmission wire body 23 is a core and a clad. The covering layer 24 is a layer covering the transmission wire body 23. A resin material constituting the covering layer 24 is not particularly limited, but can be appropriately set. For example, the wire-like transmission member 22 may be a general wire having a core wire and a covering layer 24 around the core wire, or may also be a shield wire, a twisted wire, an enamel wire, a nichrome wire, or an optical fiber.

The wire-like transmission member 22 transmitting the electrical power may be various kinds of signal lines or various kinds of power lines. Some of the wire-like transmission members 22 transmitting the electrical power may be used as an antenna or coil, for example, transmitting or receiving a signal or electrical power to or from a space.

The wire-like transmission member 22 may be a single core wire. The single core wire is a single wire-like object. The single core wire is the wire-like transmission member 22 with one transmission route. The wire-like transmission member 22 may be a multicore wire. The multicore wire is a compound body of a plurality of wire-like objects. The multicore wire is the wire-like transmission member 22 with a plurality of transmission routes. The multicore wire may be a cable made up of collected twisted wires or a plurality of wire-like objects covered by a sheath, for example.

The plurality of wire-like transmission members 22 include the electrical wire 22A having a conductor cross-sectional area of 0.35 square millimeters or less as the thinnest wire-like transmission member 22A. An electrical wire having a conductor cross-sectional area of 0.35 square millimeters is preferably an electrical wire conforming to 0.35 sq in JIS standard or an electrical wire conforming to AWG 22 in America Wire Gauge, and may also be an electrical wire having a conductor cross-sectional area slightly larger or smaller than 0.35 square millimeters. An electrical wire in a standard having a conductor cross-sectional area smaller than 0.35 square millimeters may be an electrical wire having a conductor cross-sectional area smaller than 0.35 sq (for example, an electrical wire of 0.13 sq) in JIS standard or an electrical wire in a standard having a conductor cross-sectional area smaller than AWG 22 in American Wire Gauge (for example, an electrical wire of AWG 26).

The wiring member 10 according to the present example includes the electrical wire 22A and the electrical wire 22B thicker than the electrical wire 22A. The electrical wire 22A is an example of the first wire-like transmission member 22A as the thinnest wire-like transmission member 22A. The electrical wire 22B is an example of the second wire-like transmission member 22B thicker than the first wire-like transmission member 22A.

It is sufficient that the first sheet 28 and the second sheet 30 can fix the wire-like transmission member 22, thus a material or a structure thereof is not particularly limited. Herein, the first sheet 28 and the second sheet 30 are the same type of sheet. In this case, one type of sheet is cut to an appropriate size to be able to make the first sheet 28 and the second sheet 30. Accordingly, plural types of sheets having different physical properties need not be managed. However, the first sheet 28 and the second sheet 30 may be different types of sheet. Accordingly, adoptable are sheets having physical properties appropriate for the first sheet 28 and the second sheet 30. When the first sheet 28 and the second sheet 30 need not be distinguished, they may be referred to as the sheets 28 and 30 in some cases hereinafter.

With regard to a material constituting the sheets 28 and 30, the sheets 28 and 30 are formed of a resin material herein. A material other than resin such as metal or an inorganic material, for example, may be used for the material constituting the sheets 28 and 30. The structure of the sheets 28 and 30 may be a single layer structure, or a multilayer structure of two or more layers is also applicable.

The sheets 28 and 30 may have a double layer structure including a first layer and a second layer. The first layer is a fusion layer. The wire-like transmission member 22 is fused and fixed to the fusion layer. The fusion layer includes a resin material, or preferably includes a thermoplastic resin material. The resin material of the fusion layer is softened and fused to a fusion target. A type of the resin material is not particularly limited, but polyvinyl chloride (PVC), polyethylene (PE), polypropylene (PP), or polyethylene terephthalate (PET) can be adopted, for example.

A structure of the fusion layer is not particularly limited. For example, the fusion layer may be a sheet having an evenly filled cross-sectional surface (also referred to as a non-foam sheet or a solid sheet, for example). The fusion layer is also considered a foam sheet, for example. The fusion layer is also considered a fibrous material sheet such as a braided cloth, a woven cloth, or a non-woven cloth, for example. One surface of the first layer is one main surface of each of the sheets 28 and 30.

The second layer is an additional layer. The second layer is formed of a material different from that of the fusion layer, or has a different structure. The second layer increases a function of the fusion layer, or adds a function which the fusion layer does not have to the sheets 28 and 30. A material constituting the second layer is a material described for the fusion layer described above, metal, or an inorganic material, for example. A structure of the second layer may be any of the structure described for the fusion layer described above. One surface of the second layer is the other main surface of each of the sheets 28 and 30.

The first layer and the second layer are fixed to each other while the other surface of the first layer and the other surface of the second layer have contact with each other. A fixing state of the first layer and the second layer is not particularly limited, however, fixing by fusion or adhesion is preferable. For example, when at least one of the first layer and the second layer is a sheet having voids in a surface such as a fibrous material sheet or a foam sheet, a resin material or an adhesive agent enters the voids and the layers can be fixed to each other. Such a configuration causes so-called anchor effect, thus the first layer and the second layer are rigidly fixed.

In the description herein, the first layer is a solid sheet made of resin and the second layer is a fibrous material sheet. In the description herein, the first layer and the second layer are fused to each other. That is to say, the resin of the first layer enters between the fibers of the second layer while having flowability, and is then hardened. Maintained accordingly is a state where the resin of the first layer enters between the fibers of the second layer, and the first layer and the second layer are rigidly fixed to each other.

The first layer and the second layer may be formed to have the same size (the same planar shape). One of the first layer and the second layer may also be formed to be larger than the other one thereof. The first layer and the second layer are wholly fixed at a region where they have contact with each other. The first layer and the second layer may also be fixed only at a part of a region where they have contact with each other.

The sheets 28 and 30 may be flexible members. For example, the first layer is a solid sheet made up of flexible resin such as flexible PVC as a material, the second layer is a non-woven cloth made up of PET as a material, and the sheets 28 and 30 are flexible members. For example, the sheets 28 and 30 may have a plastic property so as to be able to follow bending of the wire-like transmission member 22. It is also applicable that the wiring member 10 can be bended in a thickness direction (bending so that a fold line follows the main surface of the sheet).

Routes of the plurality of wire-like transmission members 22 are set in accordance with a position of a component to which the wire-like transmission members 22 are connected. The plurality of wire-like transmission members 22 are fixed to the first sheet 28, thus the plurality of wire-like transmission members 22 are kept in a form following a wiring route corresponding to a position of a component as a connection destination of each wire-like transmission member 22. The route of the plurality of wire-like transmission members 22 may be made up of a combination of a straight route and a bending route. The first sheet 28 may also be made up of a combination of a straight route and a bending route. The plurality of wire-like transmission members 22 may be fixed to the first sheet 28 in a state where a branch wire is branched from a main wire. The first sheet 28 may also be formed into a shape in which a part to which the branch wire is fixed is branched from a part to which the main wire is fixed. Herein, the plurality of wire-like transmission members 22 are bended on the first sheet 28. The plurality of wire-like transmission members 22 are branched on the first sheet 28.

The second sheet 30 is provided in a position closer to the connector 40 than the first sheet 28. The connector 40 and the second sheet 30 are away from each other along the extension direction of the wire-like transmission member 22. The first sheet 28 and the second sheet 30 are separated from each other. The first sheet 28 and the second sheet 30 are away from each other along the extension direction of the wire-like transmission member 22. The connector 40, the first sheet 28, and the second sheet 30 are connected to each other via the wire-like transmission member 22. The second sheet 30 is shorter in length than the first sheet 28 along the extension direction of the wire-like transmission member 22. The wire-like transmission member 22 is disposed straight on the second sheet 30.

Applicable as the fixing state of the sheets 28 and 30 and the wire-like transmission member 22 are a contact area fixation and a non-contact area fixation, or both fixations may be used together. Herein, the contact area fixation indicates that a part where the sheets 28 and 30 and the wire-like transmission member 22 have contact with each other is stuck and fixed. The non-contact area fixation is a fixing state which is not the contact area fixation, and indicates that a sewing thread, a cover, or an adhesive tape presses the wire-like transmission member 22 toward the sheets 28 and 30 or sandwiches the sheets 28 and 30 and the wire-like transmission member 22 to keep them in a fixing state.

Applicable as the configuration of the contact area fixation are a contact area indirect fixation and a contact area direct fixation, or both fixations may also be used together in different regions. Herein, the contact area indirect fixation indicates that the sheets 28 and 30 and the wire-like transmission member 22 are indirectly stuck and fixed via an adhesive agent, a gluing agent, and a double-sided adhesive tape provided therebetween. The contact area direct fixation indicates that the sheets 28 and 30 and the wire-like transmission member 22 are directly stuck and fixed without an intervention of the adhesive agent, for example, which is separately provided. Considered in the contact area direct fixation is that resin included in at least one of the sheets 28 and 30 and the wire-like transmission member 22 is melted, thus the sheets 28 and 30 and the wire-like transmission member 22 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as fusion can be used. For example, when the contact area direct fixation by heat is formed by fusion, adoptable are various types of fusion means such as ultrasonic fusion, heating pressurizing fusion, hot air fusion, and high-frequency fusion. When the state of the contact area direct fixation is formed by these means, the sheets 28 and 30 and the wire-like transmission member 22 are in the state of the contact area direct fixation by these means. Specifically, when the state of the contact area direct fixation is formed by the ultrasonic fusion, for example, the sheets 28 and 30 and the wire-like transmission member 22 are in the state of the contact area direct fixation by the ultrasonic fusion. Accordingly, the fusion fixation described above is one aspect of the contact area direct fixation.

Herein, the wire-like transmission member 22 is fused and fixed to the sheet. In this case, an outermost layer of the wire-like transmission member 22 and a fusion layer are fused to each other. The outermost layer of the wire-like transmission member 22 is the covering layer 24. The covering layer 24 is made up of a material which can be fused to the fusion layer. A resin material constituting the covering layer 24 and a resin material constituting the fusion layer are the same type of material. A resin material constituting the fusion layer and a resin material constituting the covering layer 24 are PVC or polyolefin, for example.

The plurality of fixing parts (fusion parts) where the sheets 28 and 30 and the wire-like transmission member 22 are fixed (fused) may be provided at intervals along the extension direction of the wire-like transmission member 22. The interval between the fixing parts is not particularly limited, but can be appropriately set. However, the fixing parts where the sheets 28 and 30 and the wire-like transmission member 22 are fixed may be continuously provided along the extension direction of the wire-like transmission member 22. Only one fixing part where the second sheets 30 and the wire-like transmission member 22 are fixed may be provided along the extension direction of the wire-like transmission member 22.

The connectors 40 and 50 are provided to the end portion of the wire-like transmission member 22. These connectors 40 and 50 are connected to a connector provided to the other side component, thus the wire-like transmission member 22 is connected to the other side component. That is to say, the present wiring member 10 is used as the wiring member 10 electrically connecting various types of component in a vehicle, for example (or connecting them so that they can perform optical communication). The connectors 40 and 50 are provided away from the sheets 28 and 30.

Figure 7:
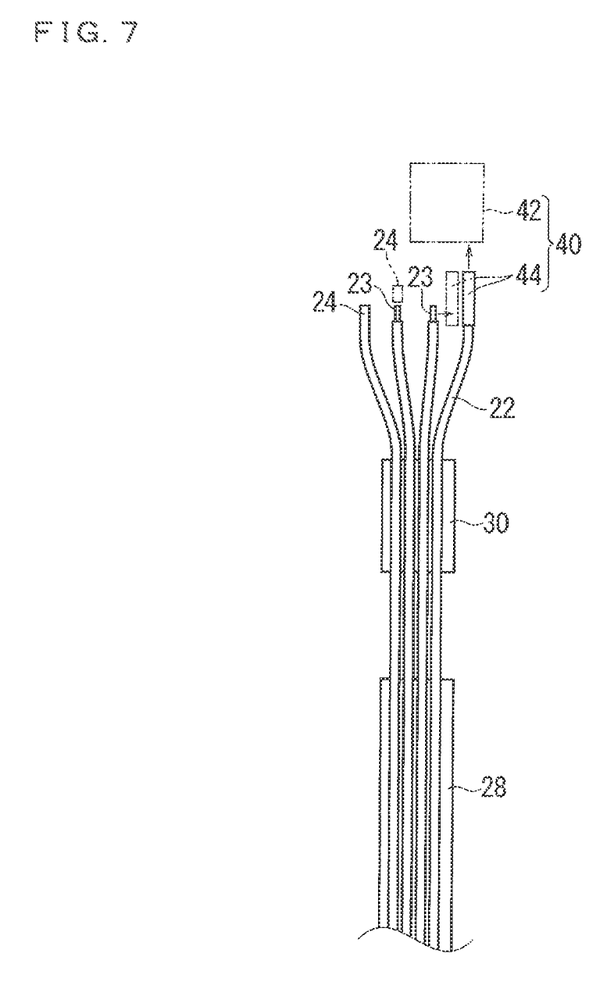
FIG. 7 is an explanation diagram illustrating manufacture of the wiring member according to the embodiment 1.

The connector 40 includes a connector housing 42 and a connector terminal 44 (refer to FIG. 7). The connector 50 also includes a connector housing and a connector terminal in the similar manner. The connector housing 42 is an injection molded product formed of resin having insulation properties as a material. A cavity is normally formed in the connector housing 42. The connector terminal 44 is housed in the cavity. The connector terminal 44 may be previously provided to the end portion of the wire-like transmission member 22. The wire-like transmission member 22 provided with the terminal 44 may be inserted into the cavity. A connection state of the terminal 44 and the wire-like transmission member 22 is not particularly limited, but crimping, melting joint, or pressure bonding, for example, is also applicable.

<Terminal Region to which Connector 30A Belongs>

Figure 2:
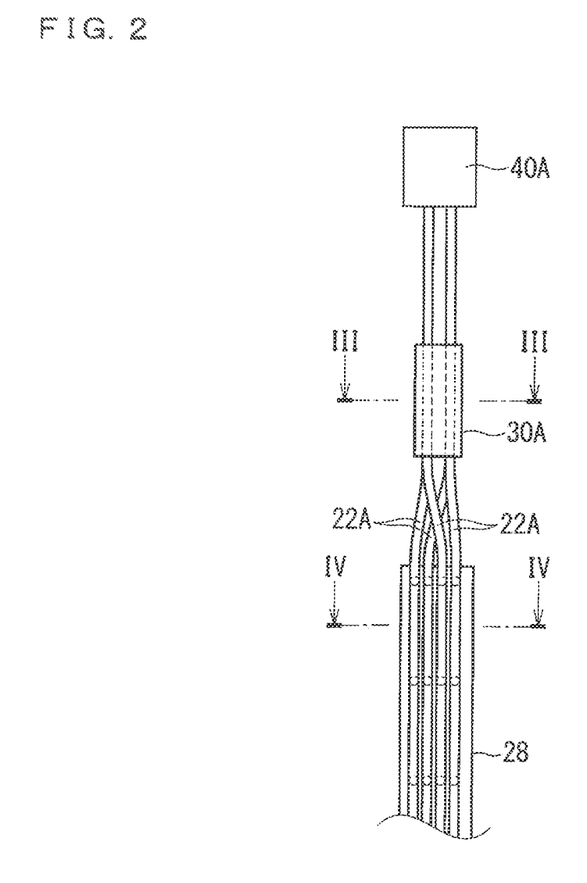
FIG. 2 is an enlarged view of a region A in FIG. 1.
Figure 4:
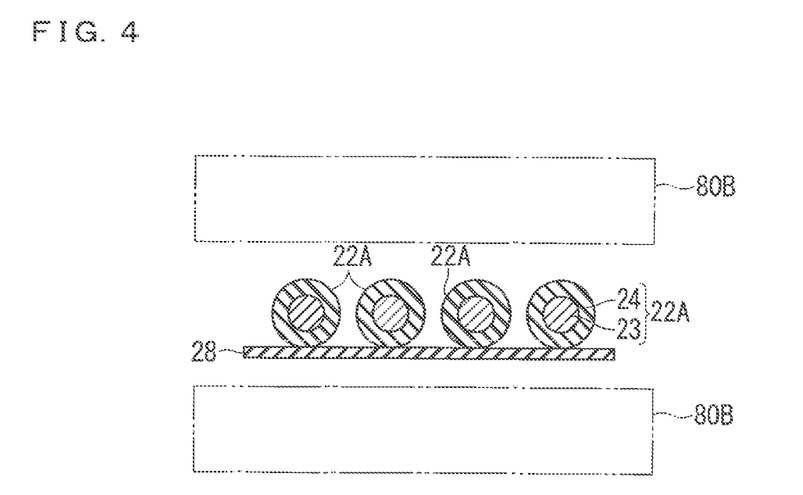
FIG. 4 is a cross-sectional view along a IV-IV line in FIG. 2.

A terminal region to which the connector 40A belongs is described with reference to FIG. 2 to FIG. 4 in addition to FIG. 1. FIG. 2 is an enlarged view of the region A (the terminal region to which the connector 40A belongs) in FIG. 1. FIG. 3 is a cross-sectional view along a III-III line in FIG. 2. FIG. 4 is a cross-sectional view along a IV-IV line in FIG. 2.

The connector 40A is provided to the end portion of the electrical wire 22A. The electrical wire 22A extends from the connector 40A. The electrical wires 22A connected to the connector 40A are the electrical wires 22A all having the same thickness. The electrical wire 22A is the thinnest electrical wire 22A in the wiring member 10. All of the electrical wires 22A connected to the connector 40A are fixed to the second sheet 30A.

A width dimension of the wiring body 20 in a position of the second sheet 30A is smaller than a width dimension of the wiring body 20 in a position of the first sheet 28 (a position of the end portion of the first sheet 28 close to the second sheet 30A). The wiring body 20 in the position of the first sheet 28 is kept in a flat state. In the example illustrated in FIG. 3, the width dimension is reduced by rounding the wiring body 20 in the position of the second sheet 30A. It is also applicable that the width dimension of the wiring body 20 in the position of the second sheet 30A is reduced by being folded. It is preferable that the width dimension of the wiring body 20 in the position of the second sheet 30A is reduced by being bended and deformed in the thickness direction.

Cavities are formed in a plurality of stages in the connector housing 42. The plurality of electrical wires 22A are disposed separately in a plurality of stages on a back end surface of the connector housing 42. The plurality of electrical wires 22A are arranged in a line in the position of the first sheet 28. The plurality of electrical wires 22A change their state between a state of being arranged in a line and a state of being separated in the plurality of stages between the first sheet 28 and the connector 40A. In the example illustrated in FIG. 2, the plurality of electrical wires 22A change their state between the state of being arranged in a line and the state of being separated in the plurality of stages between the first sheet 28 and the second sheet 30A. Furthermore, the arrangement of the plurality of electrical wires 22A is changed to an arrangement corresponding to the arrangement of the cavities between the first sheet 28 and the second sheet 30. The arrangement of the plurality of electrical wires 22A is not changed to an arrangement corresponding to the arrangement of the cavities between the second sheet 30A and the connector 40A. However, the arrangement of the plurality of electrical wires 22A may be changed to an arrangement corresponding to the arrangement of the cavities between the second sheet 30A and the connector 40A.

<Terminal Region to which Connector 40B Belongs>

Figure 5:
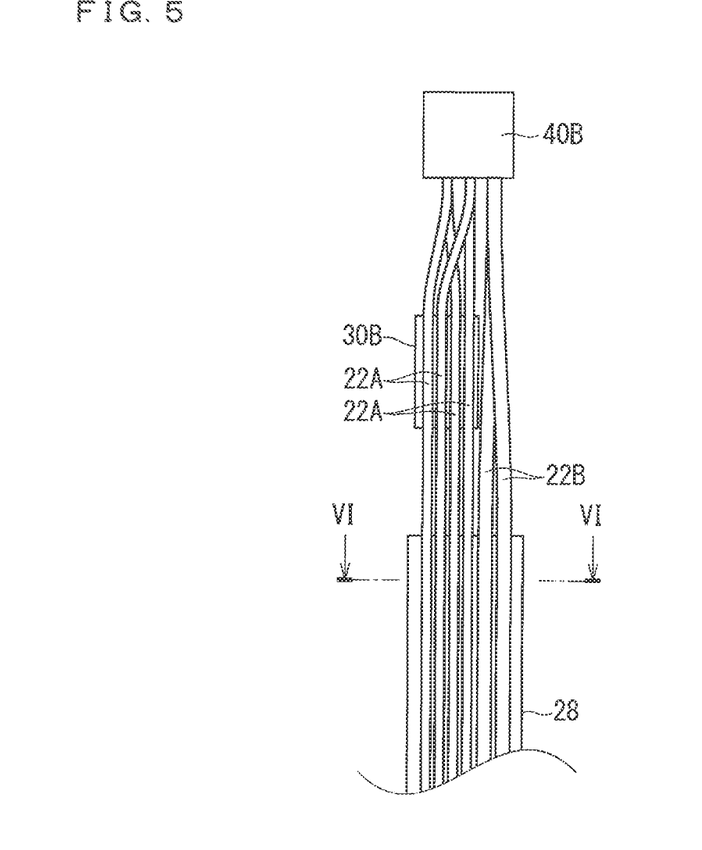
FIG. 5 is an enlarged view of a region B in FIG. 1.
Figure 6:
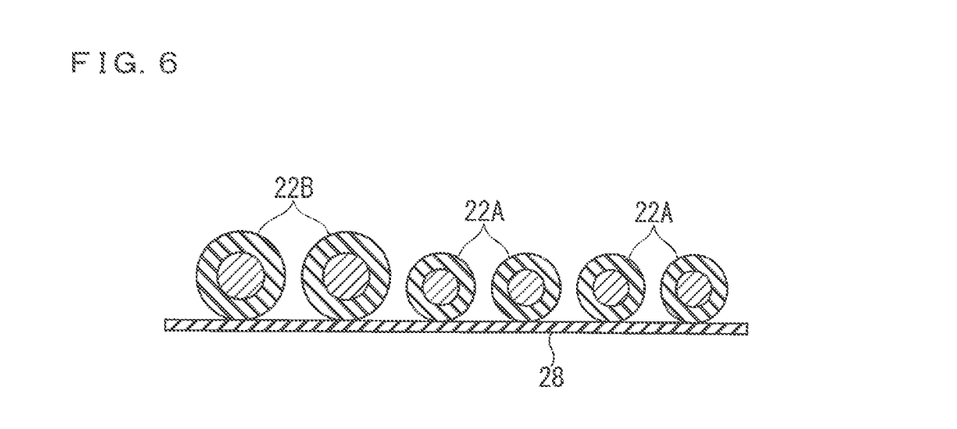
FIG. 6 is a cross-sectional view along a VI-VI line in FIG. 5.

A terminal region to which the connector 40B belongs is described with reference to FIG. 5 to FIG. 6 in addition to FIG. 1. FIG. 5 is an enlarged view of the region B (the terminal region to which the connector 40B belongs) in FIG. 1. FIG. 6 is a cross-sectional view along a VI-VI line in FIG. 5.

The connector 40B is provided to the end portions of the electrical wires 22A and 22B. The electrical wires 22A and 22B extend from the connector 40B. The electrical wire 22B is thicker than the electrical wire 22A. All of the electrical wires 22A are fixed to the second sheet 30B. None of the electrical wires 22B is fixed to the second sheet 30B. The plurality of electrical wires 22A are provided. The thickness of each electrical wire 22A is the same as each other. Accordingly, the plurality of electrical wires 22 include the plurality of electrical wires 22A as the thinnest electrical wires. Only the thinnest electrical wires 22A in the plurality of electrical wires 22 are fixed to the second sheet 30B.

The second sheet 30B is not bended. Thus, the wiring body 20 is also kept almost in a flat state in the position of the second sheet 30B. The second sheet 30B may be bended in the manner similar to the second sheet 30A. It is also applicable that the second sheet 30A is not also bended in the manner similar to the second sheet 30B which is not bended but is kept in a flat state.

<Terminal Region to which Connector 50 Belongs>

The connector 50 is provided to the end portion of the electrical wire 22B. The electrical wire 22B extends from the connector 50. The electrical wire 22B is thicker than the electrical wire 22A. The thinnest electrical wire 22A is not connected to the connector 50. The second sheet 30 is not provided to the terminal region to which the connector 50 belongs. All of the electrical wires 22B extending from the first sheet 28 are connected to the connector 50 as they are.

<Manufacturing Method>

Figure 8:
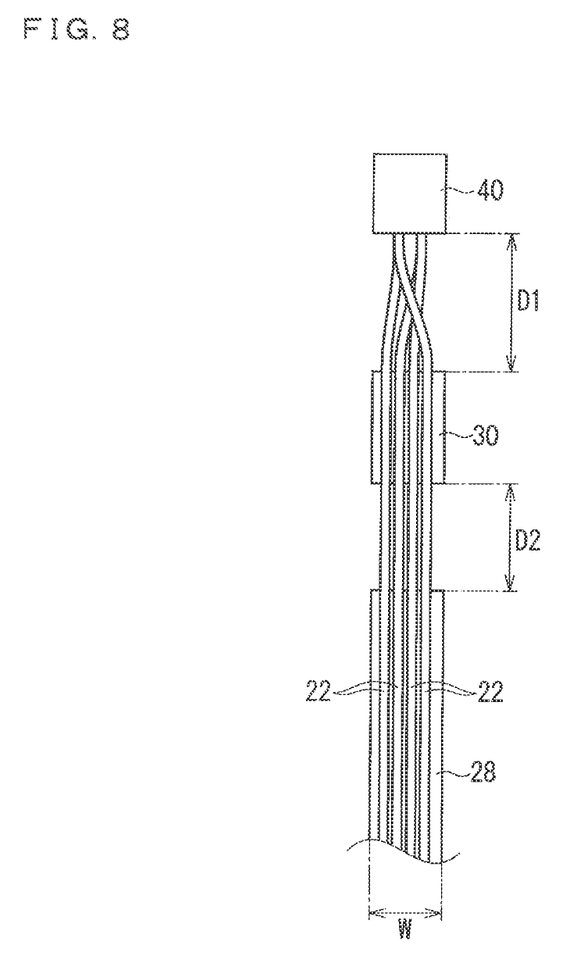
FIG. 8 is an explanation diagram illustrating manufacture of the wiring member according to the embodiment 1.

FIG. 7 and FIG. 8 are explanation diagrams each illustrating manufacture of the wiring member 10 according to the embodiment 1.

Herein, as illustrated in FIG. 7, the end portions of the plurality of wire-like transmission members 22 are processed after the plurality of wire-like transmission members 22 are fixed to the first sheet 28 and the second sheet 30. The processing process includes, for example, a process of removing the covering layer 24 on the end portion of the wire-like transmission member 22, a process of providing the terminal 44 on the end portion of the wire-like transmission member 22, and a process of inserting the terminal 44 provided on the end portion of the wire-like transmission member 22 into the connector housing 42. FIG. 7 illustrates four electrical wires 22 arranged from a left side to a right side in an order of the processing process. FIG. 7 is an exemplification for illustrating the plurality of processing processes, thus the processes need not be necessarily performed as illustrated in FIG. 7. For example, it is also applicable that after one processing process is performed on all of four electrical wires 22, the process proceeds to the next processing process.

In four electrical wires 22 in FIG. 7, the electrical wire 22 on a leftmost side is in a state before the covering layer 24 is removed. In four electrical wires 22 in FIG. 7, the second electrical wire 22 from the left is in a state after the covering layer 24 is removed and the core wire 23 is exposed. In four electrical wires 22 in FIG. 7, the third electrical wire 22 from the left is in a state where the terminal 44 is provided to the end portion the electrical wire 22 after the covering layer 24 is removed. In four electrical wires 22 in FIG. 7, the electrical wire 22 on a rightmost side is in a state where the terminal 44 is provided.

When all of the electrical wires 22 are housed in the connector housing 42, the electrical wires 22 enter a state illustrated in FIG. 8. The second sheet 30A is bended from this state, and enters a state illustrated in FIG. 2. When the second sheet 30A is not bended, it is also applicable that the wiring member 10 is completed in a state illustrated in FIG. 8.

<Interval Between Second Sheet 30 and Connector 40>

An interval between the second sheet 30 and the connector 40 is described with reference to FIG. 8. When a load applied to the electrical wire 22 occurs by movement of the connector 40, for example, the second sheet 30 is preferably provided in a position close to the connector 40. The interval between the second sheet 30 and the connector 40 (a dimension D1 in FIG. 8) may be 0 millimeter when the member becomes a product. The interval between the second sheet 30 and the connector 40 may be larger than 0 millimeter. The second sheet 30 and the connector 40 are preferably away from each other from a viewpoint of keeping easiness of processing the end portions of the plurality of wire-like transmission members 22. For example, the second sheet 30 and the connector 40 may be away from each other by 50 millimeters or more, or may also be away from each other by 120 millimeters or more.

The interval between the second sheet 30 and the connector 40 is preferably 120 millimeters or more when the member becomes a product from a viewpoint of keeping easiness of processing the end portions of the plurality of electrical wires 22. That is to say, in a case where the processing process described above is performed after the plurality of electrical wires 22 are fixed to the second sheet 30, when a dimension of a protrusion of the plurality of electrical wires 22 from the second sheet 30 is small, the electrical wires 22 are hardly held or the adjacent electrical wire 22 interferes with one electrical wire 22 in processing the one electrical wire 22. At this time, when the interval between the second sheet 30 and the connector 40 is 120 millimeters or more when the member becomes a product, the electrical wires 22 can be easily held and the adjacent electrical wire 22 hardly interferes with one electrical wire 22 in processing the one electrical wire 22. Particularly when the end portions of the plurality of electrical wires 22 are processed by an automatic machine, the interval between the connector 40 and the second sheet 30 is preferably 120 millimeters or more when the member becomes a product. A protrusion dimension of the electrical wire 22 from the second sheet 30 in manufacture, particularly before the process of removing the covering layer 24 is larger than 120 millimeters.

It is also applicable that the interval between the second sheet 30 and the connector 40 is 2000 millimeters or less, 500 millimeters or less, or 260 millimeters or less from a viewpoint of a tensile resistance load. In a case where the dimension of the thinnest electrical wire 22 protruding from the second sheet 30 is large, when a tensile load is applied to the electrical wire 22, the tensile load is hardly distributed to the other electrical wire 22 and the second sheet 30.

In consideration of these viewpoints, it is also applicable that the interval between the second sheet 30 and the connector 40 is equal to or larger than 0 millimeter and equal to or smaller than 2000 millimeters, equal to larger than 50 millimeters and equal to or smaller than 500 millimeters, or equal to or larger 120 millimeters and equal to or smaller than 260 millimeters. Needless to say, the interval between the second sheet 30 and the connector 40 is not limited to these ranges, but can be appropriately set.

<Interval Between First Sheet 28 and Second Sheet 30>

An interval between first sheet 28 and the second sheet 30 is described with reference to FIG. 8.

When a width dimension of the wiring body 20 is reduced in the position of the second sheet 30, the interval between the first sheet 28 and the second sheet 30 (dimension D2 in FIG. 8) is preferably equal to or larger than two thirds of a width dimension of the first sheet 28 in the end portion of the first sheet 28 (dimension W in FIG. 8) from a viewpoint that the wiring body 20 is easily kept in a flat state in the position of the first sheet 28.

That is to say, the first sheet 28 and the second sheet 30 are connected via the electrical wire 22. When the second sheet 30 is bended, the arrangement of the electrical wire 22 in the second sheet 30 is different from the arrangement of the electrical wire 22 in the first sheet 28. At this time, when the electrical wires 22 each having a shortest route length between the first sheet 28 and the second sheet 30 different from each other occur in the plurality of electrical wires 22, the electrical wire 22 having a large shortest route length (for example, the electrical wire 22 located in an end of the first sheet 28) pulls the first sheet 28 in a direction intersecting with the extension direction of the electrical wire 22, thus may provide force of bending deformation in a direction following the second sheet 30 to the first sheet 28. Upon receiving this force, the first sheet 28 may be bended to the direction following the second sheet 30. At this time, when the interval between the first sheet 28 and the second sheet 30 is small, this force increases, and the first sheet 28 is easily bended in the direction following the second sheet 30. When the interval between the first sheet 28 and the second sheet 30 is large, this force decreases. This force is easily absorbed by the electrical wire 22. When the interval between the first sheet 28 and the second sheet 30 is equal to or larger than two thirds of the width dimension of the first sheet 28 in the end portion of the first sheet 28, the wiring body 20 is kept in a flat state in the position of the first sheet 28 even in a case where the wiring body 20 is rounded in the position of the second sheet 30 and the width dimension thereof is reduced.

Needless to say, the interval between the first sheet 28 and the second sheet 30 needs not be equal to or larger than two thirds of the width dimension of the first sheet 28 in the end portion of the first sheet 28. The interval between the first sheet 28 and the second sheet 30 may be smaller than two thirds of the width dimension of the first sheet 28 in the end portion of the first sheet 28.

In the example illustrated in FIG. 7 and FIG. 8, the arrangement of the wire-like transmission member 22 in the second sheet 30 and the arrangement of the wire-like transmission member 22 in the end portion of the first sheet 28 are the same as each other. The arrangement of the wire-like transmission member 22 in the second sheet 30 and the arrangement of the wire-like transmission member 22 in the end portion of the first sheet 28 may be different from each other. The wire-like transmission member 22 in the second sheet 30 may be arranged to conform to the arrangement of the wire-like transmission member 22 in the connector 40.

<Effect Etc.>

According to the wiring member 10 having the above configuration, the second sheet 30 is provided between the first sheet 28 and the connector 40, thus the width dimension of the part of the second sheet 30 in the wiring body 20 close to the terminal can be reduced while keeping the part of the first sheet 28 in the wiring body 20 located away from the terminal in a flat state. Two or more wire-like transmission members 22 including all of the thinnest wire-like transmission members 22 in the plurality of wire-like transmission members 22 are fixed to the second sheet 30, thus the thinnest wire-like transmission member 22 can withstand the larger impact load. More specifically, even in a case where the load is applied the thinnest wire-like transmission member 22A by movement of the connector 40, for example, when two or more wire-like transmission members 22 including the thinnest wire-like transmission member 22A are fixed to the second sheet 30, the load applied to the thinnest wire-like transmission member 22A can be dispersed to the second sheet 30 or the other wire-like transmission member 22 fixed to the second sheet. Accordingly, the thinnest wire-like transmission member 22A to which the load is applied by the movement of the connector 40, for example, can also withstand the load.

The plurality of wire-like transmission members 22 include the electrical wire 22A having a conductor cross-sectional area of 0.35 square millimeters or less as the thinnest wire-like transmission member 22A. Accordingly, a position where the electrical wire 22A having a conductor cross-sectional area of 0.35 square millimeters or less can be easily used is increased in a vehicle, and cost and weight of the wiring member 10 for the vehicle can be reduced.

The interval between the connector 40 and the second sheet 30 is equal to or larger than 120 millimeters and equal to or smaller than 260 millimeters. Accordingly, the wire-like transmission members 22 can withstand the larger tensile load while keeping easiness of housing the end portions of the plurality of wire-like transmission members 22 in the connector housing 42.

The interval between the first sheet 28 and the second sheet 30 is equal to or larger than two thirds of the width dimension of the first sheet 28 in the end portion of the first sheet 28. Accordingly, the width dimension of the part of the wiring body 20 close to the terminal can be reduced while keeping the part thereof located away from the terminal in a flat state.

The width dimension of the wiring body 20 in the position of the second sheet 30A is smaller than the width dimension of the wiring body 20 in the position of the first sheet 28. Accordingly, even in a case where the region located close to the connector 40A in the region where the wiring member 10 is disposed in the vehicle has a gap (width) narrowed by the surrounding member 80A as illustrated in FIG. 3, interference between the wiring member 10 and the surrounding member 80A is suppressed. Even in a case where the region located away from the connector 40A in the region where the wiring member 10 is disposed in the vehicle has a gap (height) narrowed by the surrounding member 80B as illustrated in FIG. 4, interference between the wiring member 10 and the surrounding member 80B is suppressed.

All of the plurality of wire-like transmission members 22A extending from the connector 40A are fixed to the second sheet 30A in the connector 40A. Accordingly, the wire-like transmission member 22A easily withstands the larger tensile load. In the plurality of wire-like transmission members 22A, it is not necessary to distinguish between those which are fixed to the second sheet 30A and those which are not.

In the connector 40B, the plurality of wire-like transmission members 22 include the first wire-like transmission members 22A as the thinnest wire-like transmission members 22A and the second wire-like transmission members 22B thicker than the first wire-like transmission members 22A, and at least one of the second wire-like transmission members 22B is not fixed to the second sheet 30B. Accordingly, a region for fixing the second wire-like transmission member 22B can be reduced in the second sheet 30B.

Only the plurality of thinnest wire-like transmission members 22A are fixed to the second sheet 30 in the connector 40A. Tis condition is considered one of the strictest conditions in durability of the wire-like transmission member 22A, however, even in this case, the load can be dispersed to the other thinnest wire-like transmission member 22A or the second sheet 30, thus the thinnest wire-like transmission member 22A can withstand the larger tensile load. More specifically, when the plurality of wire-like transmission members 22A are fixed to the second sheet 30, even in a case where the load is applied one thinnest wire-like transmission member 22A by movement of the connector 40A, for example, the load can be dispersed to the other wire-like transmission member 22A via the second sheet 30. Accordingly, the wire-like transmission member 22A to which the load is applied by the movement of the connector 40A, for example, can also withstand the load.

APPENDIX

In the above description, the plurality of thinnest wire-like transmission members 22A are provided to the plurality of wire-like transmission members 22 connected to the connector 40, however, this configuration is not necessary. Only one thinnest wire-like transmission member 22A may be provided to the plurality of wire-like transmission members 22 connected to the connector. In this case, two or more wire-like transmission members fixed to the second sheet are preferably a group of the thinnest wire-like transmission member 22A and the wire-like transmission member thicker than the thinnest wire-like transmission member 22A. When the plural types of wire-like transmission member each having different thickness are provided as the wire-like transmission members thicker than the thinnest wire-like transmission member 22A, the wire-like transmission member having any thickness may be fixed to the second sheet. For example, the thinnest wire-like transmission member 22A and a second thinnest wire-like transmission member may be fixed to the second sheet.

In the above description, the plurality of wire-like transmission members 22 include the electrical wire 22A having the conductor cross-sectional area of 0.35 square millimeters or less as the thinnest wire-like transmission member 22A, however, this configuration is not necessary. For example, the plurality of wire-like transmission members 22 may include the electrical wire having a conductor cross-sectional area larger 0.35 square millimeters as the thinnest wire-like transmission member.

In the example described above, the wiring member 10 includes the wire-like transmission members 22A and 22B each having a different thickness, however, this configuration is not necessary. The plurality of wire-like transmission members in the wiring member 10 may be the wire-like transmission members having the same thickness.

In the above description, the second sheet 30 is provided to all the connectors 40 to which the plurality of thinnest wire-like transmission members 22 are connected, however, this configuration is not necessary. The second sheet 30 may not be provided to some of the plurality of connectors to which the thinnest wire-like transmission member 22 is connected. For example, when the end portion of the first sheet is rounded in the manner similar to the second sheet 30A described above, the end portion of the first sheet may extend to the position of the second sheet 30A.

In the above description, some or all of the wire-like transmission members 22B thicker than the thinnest wire-like transmission member 22 are not fixed to the second sheet 30B, however, this configuration is not necessary. Some or all of the wire-like transmission members 22B thicker than the thinnest wire-like transmission member 22A may be fixed to the second sheet 30B. In this case, the member can easily withstand the larger tensile load compared with a case where only the thinnest wire-like transmission member 22A is fixed to the second sheet 30B.

The configurations described in the embodiments and modification examples thereof can be appropriately combined as long as they are not contradictory.

EXPLANATION OF REFERENCE SIGNS 10 wiring member
20 wiring body
22 electrical wire (wire-like transmission member)
22A electrical wire (first wire-like transmission member)
22B electrical wire (second wire-like transmission member)
23 transmission wire body
24 covering layer
28 first sheet
30, 30A, 30B second sheet
40, 40A, 40B, 50 connector
42 connector housing
44 terminal

The invention claimed is:

1. A wiring member, comprising:
a wiring body including a plurality of wire-like transmission members, a first sheet to which the plurality of wire-like transmission members are fixed, and a second sheet; and
a connector, wherein
the plurality of wire-like transmission members include a plurality of first wire-like transmission members and at least one second wire-like transmission member,
the plurality of first wire-like transmission members are thinnest among the plurality of wire-like transmission members, and the at least one second wire-like transmission member is thicker than the plurality of first wire-like transmission members,
at least the plurality of first wire-like transmission members are connected to the connector,
the second sheet is provided between the first sheet and the connector,
all of the plurality of first wire-like transmission members are fixed to the second sheet,
the at least one second wire-like transmission member is not fixed to the second sheet,
the second sheet is bended and deformed in a thickness direction so that a width dimension of the wiring body in a position of the second sheet is reduced, and the width dimension of the wiring body in the position of the second sheet is smaller than the width dimension of the wiring body in the position of the first sheet.

2. The wiring member according to claim 1, wherein the plurality of wire-like transmission members include an electrical wire having a conductor cross-sectional area of 0.35 square millimeters or less as each of the first wire-like transmission members.

3. The wiring member according to claim 1, wherein an interval between the connector and the second sheet is equal to or larger than 120 millimeters and equal to or smaller than 260 millimeters.

4. The wiring member according to claim 1, wherein an interval between the first sheet and the second sheet is equal to or larger than two thirds of a width dimension of the first sheet in an end portion of the first sheet.

5. The wiring member according to claim 1, wherein only the plurality of first wire-like transmission members are fixed to the second sheet.

6. The wiring member according to claim 1, wherein the plurality of wire-like transmission members further include at least one third wire-like transmission member,
the at least one third wire-like transmission member is second thinnest among the plurality of wire-like transmission members, and
the at least one third wire-like transmission member is fixed to the second sheet.

7. The wiring member according to claim 1, wherein the at least one second wire-like transmission member is connected to the connector.

* * * * *